United States Patent [19]
Kaneko

[11] Patent Number: 5,850,136
[45] Date of Patent: Dec. 15, 1998

[54] BATTERY CHARGER

[75] Inventor: Akira Kaneko, Shirakawa, Japan

[73] Assignees: Integran, Inc.; Japan Tobacco, Inc., both of Tokyo, Japan

[21] Appl. No.: 856,319

[22] Filed: May 14, 1997

[30]   Foreign Application Priority Data

Dec. 26, 1996   [JP]   Japan ..................................... 8-348624

[51] Int. Cl.[6] ................................................. H01M 10/46
[52] U.S. Cl. ........................................... 320/119; 320/122
[58] Field of Search .................................... 320/107, 116, 320/118, 119, 120, 122, 132, 136, 104, 105, 114, 117, 142

[56]   References Cited

U.S. PATENT DOCUMENTS

| | | | |
|---|---|---|---|
| 4,614,905 | 9/1986 | Petersson et al. . | |
| 5,469,042 | 11/1995 | Ruhling | 320/122 |
| 5,523,668 | 6/1996 | Feldstein | 320/119 X |
| 5,578,914 | 11/1996 | Morita | 320/122 |
| 5,617,004 | 4/1997 | Kaneko | 320/119 |
| 5,644,209 | 7/1997 | Chabbert et al. | 320/122 |

FOREIGN PATENT DOCUMENTS

| | | |
|---|---|---|
| 6-28491 | 4/1994 | Japan . |
| 8-019188A | 1/1996 | Japan . |

*Primary Examiner*—Edward Tso

[57]   ABSTRACT

A battery charger includes charge control circuits each connected in parallel with an associated one of serially-connected battery cells. Each charge control circuit includes a switching device; a comparator, having a hysteresis characteristic determined by two threshold voltages, e.g., a safe charging voltage and an optimum charging voltage, for comparing the battery voltage with one of the threshold voltages selected according to a changing direction of the battery voltage; a reference voltage source for generating a reference voltage corresponding to either one of the threshold values; and a driving circuit for receiving a comparator output to render the switching device conductive or cutoff. When the battery voltage falls between the threshold voltages, the switching device becomes conductive to cause a constant current to flow from the battery cell to the switching device.

14 Claims, 10 Drawing Sheets

BATTERY CHARGER

BACKGROUND OF THE INVENTION

1. Field of the Invention

This invention relates to a battery charger suitable for charging a battery array constituted by serially-connected battery cells comprised of, e.g., lithium-ion batteries.

2. Description of the Related Art

Recently, attempts are made to use Ni—Cd battery, Li battery, Ni—H battery and the like with high energy density as the driving sources of industrial robots, electric vehicles or the like. This type of battery generally has an output power of 1.2 to 4.2 V per unit cell, and in a general application, a plurality of battery cells are serially connected so as to obtain a required output.

An electrode of a lithium-ion battery or the like is formed of a material liable to be damaged if the battery is excessively charged or discharged, and therefore, it is strictly required to manage the charging voltage of the battery. Moreover, if a significant difference in the remaining capacity is present between the serially-connected battery cells, such a difference acts as a load which causes the entirety of charging capacities of the battery cells to be lowered. In charging the serially-connected battery cells, therefore, it is necessary to eliminate an influence caused by the characteristic difference between the battery cells.

Japanese Patent Application KOKOKU Publication No. 6-28491 discloses a technique for equalizing the charging voltages of the battery cells by use of charge regulators connected individually to serially-connected battery cells. Each charge regulator operates to selectively divert a charging current from a corresponding one battery cell to the charge regulator according to the charging voltage of the battery cell.

In order to prevent a particular one or ones of the battery cells from being fully discharged, the technique disclosed in the above Publication is designed to supply each battery cell with a trickle charging current of, e.g., 300 mA corresponding to a self discharge current of the battery cell. To regulate the trickle charging current, resistance values of impedance circuits respectively connected in parallel with the battery cells are changed, to thereby continuously change currents flowing through the impedance circuits according to the charging voltages of the battery cells.

In the case of a battery array mounted on an electric vehicle or the like, the battery array is ordinarily charged when the remaining capacity of the battery array is considerably lowered, and hence a charging current of several tens of ampere is to be supplied to the battery array. From this point of view, it is not practical to carry out the diversion or bypass control for such a large charging current based on the technique disclosed in the above Publication since the load loss in the impedance circuit becomes extremely large in that case.

To obviate this, Japanese Patent Application KOKAI Publication No. 8-19188 discloses a technique for equalizing the charging voltages of battery cells by use of bypass circuits provided individually to serially-connected battery cells. When a voltage difference between the lowest charging voltage and the remaining charging voltages has exceeded a preset value, those bypass circuits which are connected to the battery cells other than the battery cell having the lowest charging voltage are rendered conductive, to thereby interrupt the charging operations for the other battery cells. When the voltage difference becomes small, these bypass circuits are rendered cutoff, to start the charging operations for the other battery cells again.

The technique disclosed in the above Publication requires a long time for charging the battery array because the charging operation progresses so as to meet the charged condition of the battery cell having the lowest voltage while interrupting the charging operation for the remaining battery cells according to the charging voltage difference. In addition, the battery charger based on this technique is complex in construction for the reason, e.g., that a PWM control must be made to selectively render the bypass circuits conductive or non-conductive.

SUMMARY OF THE INVENTION

An object of this invention is to provide a battery charger which is simple in construction and which can efficiently charge serially-connected battery cells in a well-balanced manner while adequately managing the battery voltage across each of the battery cells.

Another object of this invention is to provide a charge control circuit suitable for constructing the above type of battery charger.

According to one aspect of the present invention, a battery charger is provided which comprises a direct current power source adapted to be connected in series with a battery array which is comprised of serially-connected battery cells; and charge control circuits adapted to be connected in parallel with the serially-connected battery cells, respectively. The direct current power source is operable to output a predetermined maximum electric current when it performs a constant-current operation.

Each of the charge control circuits includes a switching device which is connected in parallel with an associated one of the battery cells when the charge control circuit is connected to the associated one battery cell, and a comparator, having a hysteresis characteristic thereof determined by a first threshold voltage and a second threshold voltage lower than the first threshold voltage, for comparing a battery voltage across the associated one battery cell with one of the first and second threshold voltages which is selected depending on a direction in which the battery voltage changes and for generating a comparator output indicative of a result of the comparison between the battery voltage and the selected one threshold voltage. The first and second threshold voltages are determined according to charging characteristics of the serially-connected battery cells.

Each of the charge control circuits further includes a reference voltage source for generating a reference voltage corresponding to one of the first and second threshold voltages, and a driving circuit for selectively rendering the switching device conductive according to the comparator output. The driving circuit is operable to permit a constant current to flow from the associated one battery cell to the switching device when the switching device is conductive.

Preferably, the comparator generates a comparator output of a first level until the battery voltage across the associated one battery cell reaches the first threshold voltage, generates a comparator output of a second level when the battery voltage rises and reaches the first threshold voltage, and generates a comparator output of the first level when the battery voltage drops and becomes lower than the second threshold voltage. The driving circuit causes the switching device to be cutoff while the comparator output is at the second level and causes the switching device to be conductive while the comparator output is at the first level.

Preferably, the first threshold voltage is a voltage corresponding to a safe charging voltage of the associated one battery cell and the second threshold voltage is a voltage corresponding to an optimum charging voltage of the associated one battery cell.

In the battery charger with the above construction, a maximum amount of current is supplied from the direct current power source to the respective battery cells until the battery voltage across any one of the battery cells reaches the first threshold voltage (safe charging voltage) whereby the battery cells are charged. When the battery voltage across any one of the battery cells reaches the first threshold voltage, the switching device connected to this battery cell is rendered conductive, i.e., turned ON. A current flowing through the switching device is made constant. As a result, a constant amount of current out of the charging current for the battery cell is caused to flow through the switching device, as a bypass current, so that the charging current is drooped, and preferably falls into a safe charging current region. The bypass current is returned to other battery cells whose battery voltages have not yet reached the first threshold voltage, thereby permitting the other battery cells to be supplied with a maximum charging current obtainable at that time. If, as a result of permitting the charging current for the battery cell whose battery voltage has reached the first threshold voltage to be diverted to flow through the switching device, the charging current becomes negative, i.e., the battery cell is discharged to the extent that the battery voltage becomes lower than the second threshold voltage (optimum charging voltage), then the switching device is rendered to be cutoff, i.e., turned OFF whereby the charging operation for the battery cell is started again.

This invention is advantageous in that one or more approximately fully charged battery cells are permitted to be charged and discharged as required, by forcibly drawing a constant amount of current out of the charging current for the individual battery cell concerned, while efficiently charging one or more insufficiently charged battery cells by supplying the maximum charging current thereto. This makes it possible to efficiently charge all the battery cells to the second threshold voltage (optimum charging voltage) in a well-balanced manner. Further, the battery charger of this invention can be made relatively simple in construction and the charge control precision can be made sufficiently high.

In the battery charger of this invention, preferably, the charge control circuit has a high internal resistance. A voltage applied from the direct current power source to the charge control circuits and also applied to the battery array is substantially equally divided between the charge control circuits and between the battery cells.

With this arrangement, the charge control circuits can be operated without the need of providing power source units for the respective charge control circuits and hence the construction of the battery charger can be simplified.

Preferably, the reference voltage source of each of the charge control circuits generates the reference voltage based on a voltage which is applied from the direct current power source to the charge control circuits and then substantially equally divided between the charge control circuits. Each of the charge control circuits includes a voltage divider circuit for generating a voltage corresponding to the battery voltage across the associated one battery cell based on a voltage which is applied from the direct current power source to the battery array and then substantially equally divided between the battery cells. The thus generated voltage corresponding to the battery voltage across the associated one battery cell is supplied to the comparator.

With this arrangement, the reference voltage source can be made simple in construction.

Preferably, each of the charge control circuits includes a current line through which the switching device is connected with the associated one battery cell and a power source line provided independently of and separately from the current line. The comparator and the driving circuit of the charge control circuit are connected with the associated one battery cell via the power source line.

With this arrangement, the comparator and the driving circuit are permitted to carry out their actions with high precision according to a change in the voltage across the battery cell, without being influenced by the operating state of the switching device.

Preferably, each of the charge control circuits includes an abnormality detection circuit for monitoring occurrence of an abnormality including over-charging and over-discharging of the associated one battery cell. With this arrangement, whether or not an abnormality such as over-charging and over-discharging occurs in the individual battery cells can be monitored. This permits the user to take necessary countermeasures against the abnormality observed.

According to another aspect of this invention, there is provided a charge control circuit for a battery charger operable to charge a battery array comprised of serially-connected battery cells. The charge control circuit is adapted to be connected in parallel with an associated one of the battery cells. The charge control circuit comprises a switching device connected in parallel with the associated one battery cell, a comparator, having a hysteresis characteristic thereof determined by a first threshold voltage and a second threshold voltage lower than the first threshold voltage, for comparing a battery voltage across the associated one battery cell with one of the first and second threshold voltages which is selected depending on a direction in which the battery voltage changes and for generating a comparator output indicative of a result of the comparison between the battery voltage and the selected one threshold voltage, a reference voltage source for generating a reference voltage corresponding to one of the first and second threshold voltages, and a driving circuit for selectively rendering the switching device conductive according to the comparator output and permitting a constant current to flow from the associated one battery cell to the switching device. The first and second threshold voltages are determined according to charging characteristics of the serially-connected battery cells.

DETAILED DESCRIPTION

Figure 1:
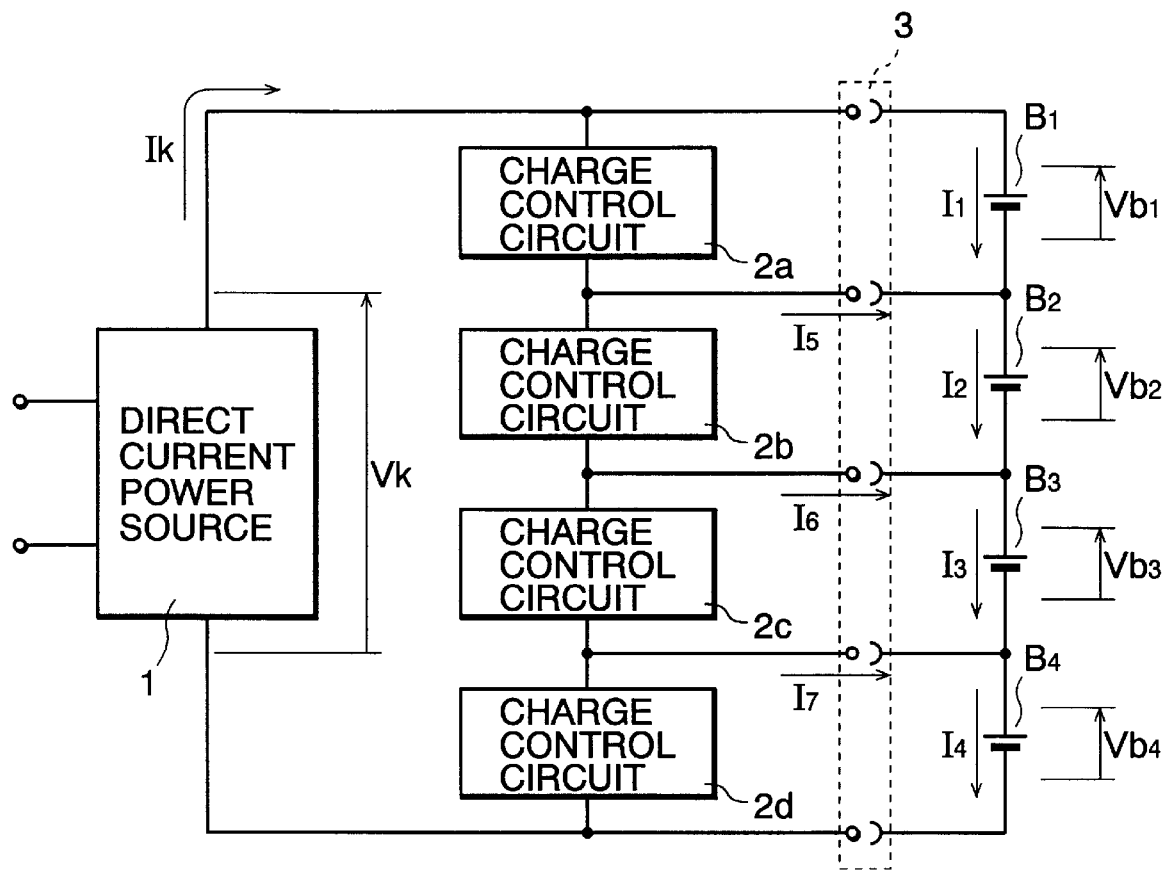
FIG. 1 is a schematic circuit diagram showing a battery charger according to one embodiment of this invention.

There will now be described a battery charger according to one embodiment of this invention with reference to the accompanying drawings.

The battery charger is used for charging a battery array. As shown by way of example in FIG. 1, the battery array is comprised of serially connecting four lithium-ion battery cells $B_1$, $B_2$, $B_3$, $B_4$ (arbitrary one or ones of lithium-ion battery cells are hereinafter referred to as battery cells B). The battery charger includes a direct current power source 1 constituted by a DC-DC converter or AC-DC converter, charge control circuits 2a, 2b, 2c, 2d (arbitrary one or ones of the charge control circuits are hereinafter denoted by reference numeral 2) which are equal in number to the battery cells $B_1$, $B_2$, $B_3$, $B_4$ and connected in series with the direct current power source 1, and a connector section 3. The direct current power source 1 is adapted to be removably connected in series with the battery array via the connector section 3. When the power source 1 and the charge control circuits 2a to 2d connected therewith are connected to the battery array, each of the charge control circuits 2 is connected in parallel with a corresponding one of the battery cells B via the connector section 3.

Figure 2:
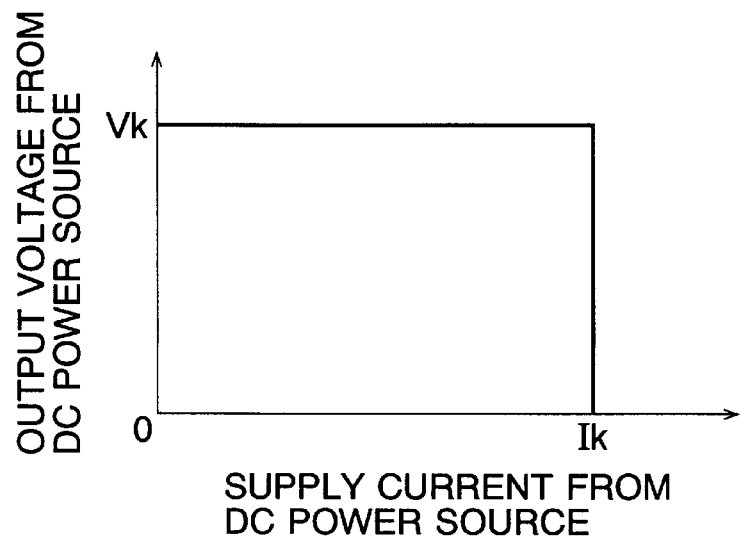
FIG. 2 is a graph showing an operating characteristic of a direct current power source used in the battery charger of FIG. 1.

The direct current power source 1 is designed to serve as a constant-current/constant-voltage power source which performs a constant-current operation in the initial stage of the charging process and then performs a constant-voltage operation. The direct current power source 1 supplies, at the time of constant-current operation, a maximum supply current of constant value Ik (for example, 7 A) which is determined in advance according to the charging/discharging characteristics of the battery cell B, and generates an output voltage of constant value Vk at the time of constant-voltage operation (refer to FIG. 2). The output voltage value Vk is set to a value equal to the sum of the optimum charging voltages of the battery cells $B_1$, $B_2$, $B_3$, $B_4$. For example, the output voltage Vk is set to 16.6 V when the optimum charging voltage is 4.16 V.

The charge control circuits 2a to 2d, each having a high internal resistance, function to substantially equally divide an output voltage of the direct current power source 1 applied to the charge control circuits 2a to 2d and also applied to the battery cells $B_1$, $B_2$, $B_3$, $B_4$ between the charge control circuits and between the battery cells. Each of the charge control circuits 2a to 2d is operable, as required, to divert a constant amount of current out of a current supplied from the direct current power source 1 to an associated one battery cell $B_1$, $B_2$, $B_3$ or $B_4$, so that the constant amount of current is diverted from the associated one battery cell to the charge control circuit.

Figure 5:
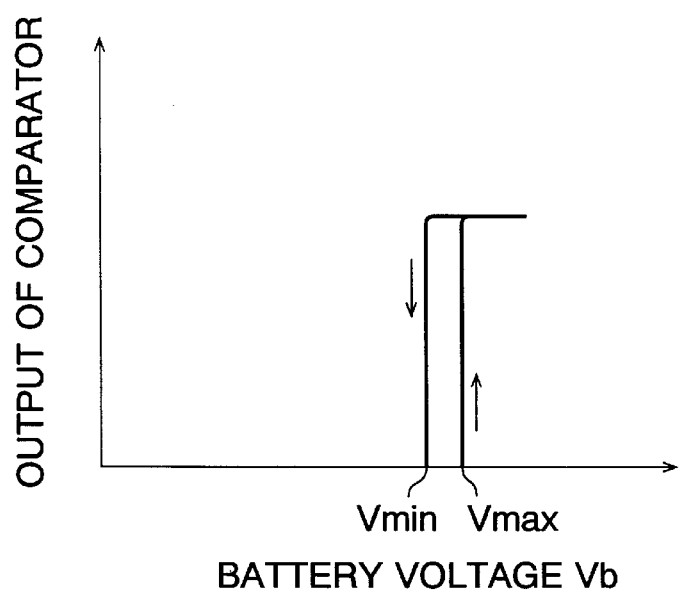
FIG. 5 is a diagram showing a hysteresis characteristic of a comparator used in the charge control circuit shown in FIG. 4.
Figure 4:
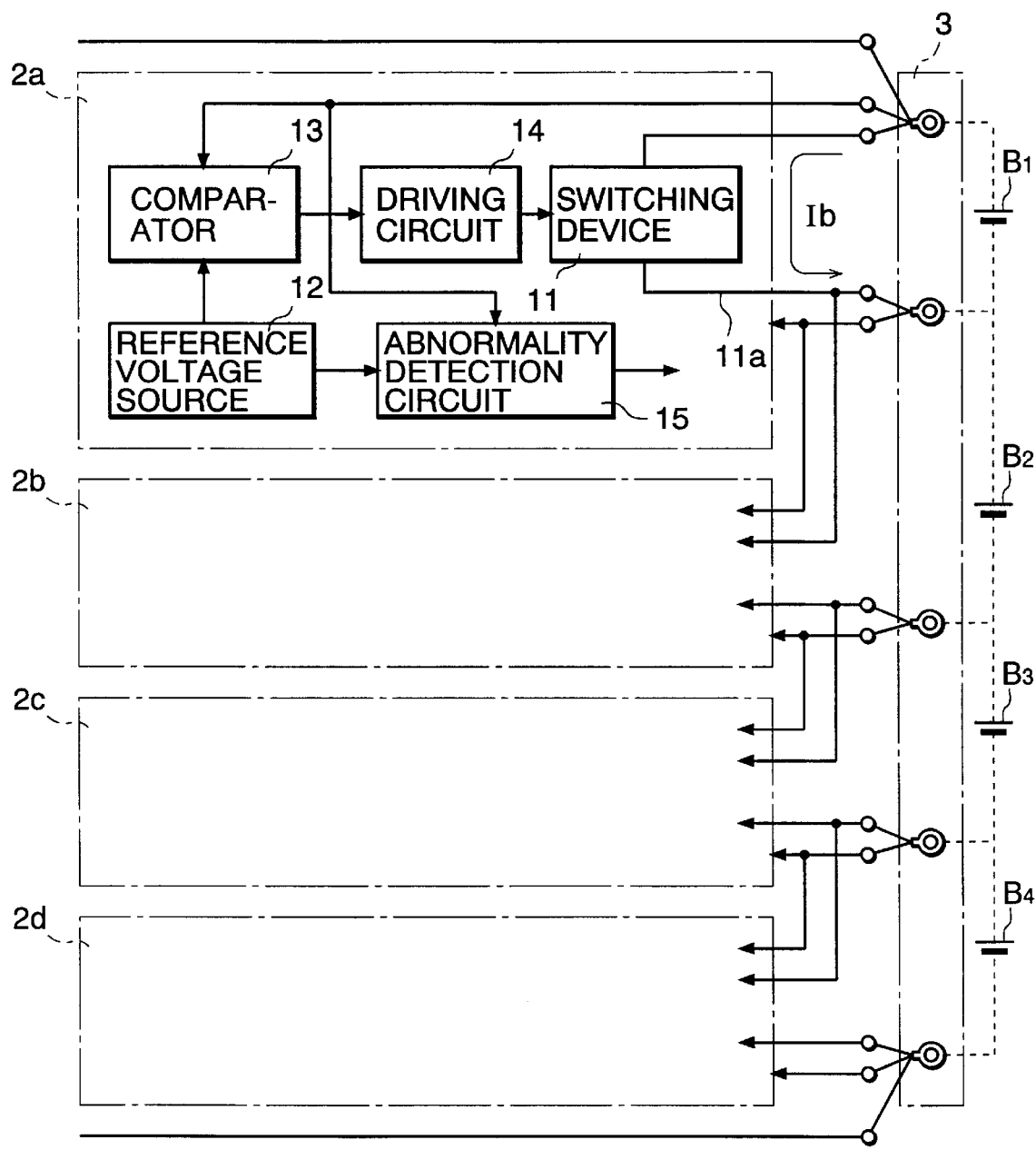
FIG. 4 is a schematic circuit diagram showing a charge control circuit used in the battery charger shown in FIG. 1.

As is schematically shown in FIG. 4, each charge control circuit 2 includes a switching device 11 connected in parallel with the corresponding one battery cell B via the connector section 3, and a reference voltage source 12 for generating a predetermined reference voltage. For example, the reference voltage is equivalent to the safe charging voltage Vmax (FIG. 5) of the battery cell B. The charge control circuit 2 further includes a comparator 13 for comparing the battery voltage Vb (FIG. 5) across the battery cell B with the reference voltage, a driving circuit 14 for turning ON and OFF the switching device 11 according to the level of an output of the comparator 13, and an abnormality detection circuit 15 for detecting the over-charging/over-discharging state of the battery cell B.

The comparator 13 has a hysteresis characteristic (FIG. 5) which meets the charging/discharging characteristic of the battery cell B. To realize this hysteresis characteristic, the comparator 13 has an internal circuit characteristic such as to give two threshold voltages which determine the hysteresis characteristic. For example, one of the two threshold voltages is set equal to the reference voltage (safe charging voltage Vmax) generated by the reference voltage source 12 and the other threshold voltage is set equal to the charge interruption voltage Vmin equivalent to the optimum charging voltage of the battery cell B. The optimum charging voltage is set to a level lower than the safe charging voltage Vmax by a preset amount.

The comparator 13 is designed to output a comparator output of a first level (for example, high-level output) until the battery voltage Vb reaches the safe charging voltage Vmax and output a comparator output of a second level (for example, low-level output) when the battery voltage Vb rises and reaches the safe charging voltage Vmax. The comparator 13 operates to output the first level output when the battery voltage Vb decreases and becomes lower than the charge interruption voltage (optimum charging voltage) Vmin after the battery voltage Vb has once reached the safe charging voltage Vmax. The amplifier 14 is designed to turn ON the switching device 11 while it receives the second level output from the comparator 13 and turn OFF the switching device 11 while it receives the first level comparator output.

That is, the comparator 13 is designed to generate the second level output in a period from the time the battery voltage Vb has reached the safe charging voltage Vmax to the time it becomes lower than the interruption voltage Vmin. The amplifier 14 is designed to turn ON the switching device 11 during this period.

Each charge control circuit 2 is so designed that a bypass current Ib (FIG. 4) of constant value will flow through the switching device 11 and current line 11a when the switching device 11 is turned ON. For example, the charge control circuit 2 operates to inversely feed back a voltage, which varies according to the bypass current value, to the amplifier 14, so that negative feedback is achieved. The bypass current Ib is determined based on the charging/discharging characteristic of the battery cell B. For example, the bypass current is set at a value one-half to one-thirds of the maximum supply current value Ik, more specifically, at 3 amperes.

In case that the optimum charging voltage Vmin of the battery cell B is approx. 4.16 V, the safe charging voltage Vmax is set at, e.g., 4.20 V, and the interruption voltage is set at a voltage equal to or slightly lower than the optimum charging voltage Vmin.

The abnormality detection circuit 15 is designed to compare the battery voltage Vb across the battery cell B with predetermined thresholds indicative of abnormally high voltage and abnormally low voltage, and generate an abnormality observation signal if the battery voltage Vb becomes higher than the abnormally high voltage or lower than the abnormally low voltage so that it falls outside an allowable voltage range. In response to the generation of the abnormality observation signal, emergency interruption of the direct current power source 1, generation of an abnormality observation message and the like are performed. In the case of lithium-ion battery cell, the abnormally high voltage and abnormally low voltage are respectively set to 4.33 V and 2.70 V, for example.

Figure 6:
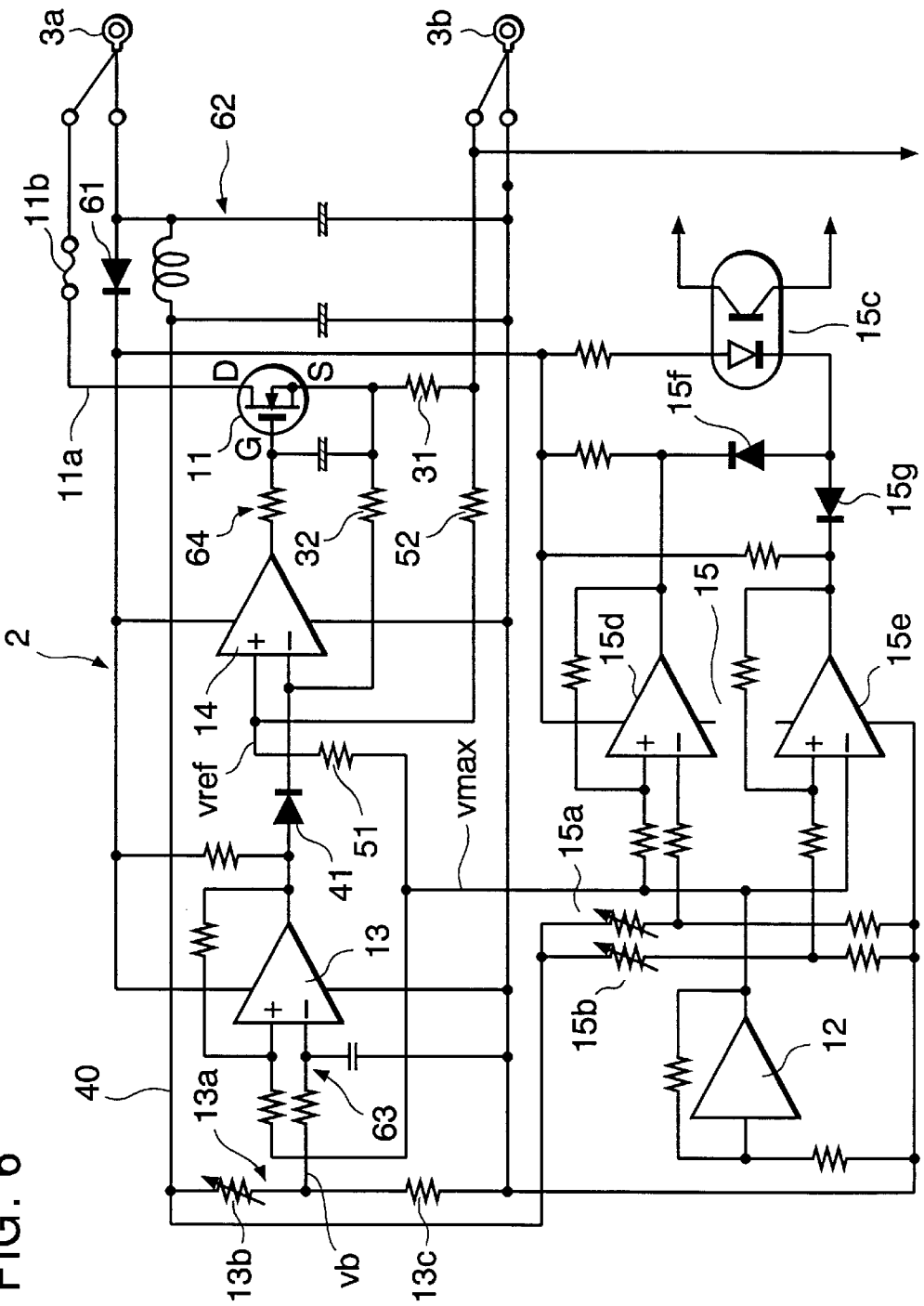
FIG. 6 is a circuit diagram showing a concrete example of the construction of the charge control circuit used in the battery charger shown in FIG. 1.

FIG. 6 shows an example of the concrete circuit construction of the charge control circuit 2.

In FIG. 6, the switching device 11 is comprised of a high-power field-effect transistor which is operable on a low voltage, for example, approx. 2.5 V. More specifically, the switching device is comprised of a MOS-FET (manufactured by Fuji Electric Co., Ltd. in Japan; typename 2SK-1969-01). The drain electrode D and source electrode S of the FET 11 are connected, via a bypass current line 11a formed of an exclusive cable, individually to corresponding two (shown by reference numerals 3a and 3b in FIG. 6) of the terminals of the connector section 3. A fuse 11b for protecting the FET 11 from an excessively large current is connected in series with the bypass current line 11a.

The reference voltage source 12 is comprised of a constant-voltage source IC of low power consumption type. The reference voltage source 12 is operated on the battery voltage Vb, applied as a drive voltage from the battery cell B to the charge control circuit 2, to generate a reference voltage vmax indicative of the safe charging voltage Vmax.

A voltage divider circuit 13a includes a variable resistor 13b having one end thereof connected with the terminal 3a of the connector section 3 via a voltage sensing line 40, and a fixed resistor 13c having one end thereof connected with the other end of the variable resistor 13b. The voltage divider circuit serves to divide the battery voltage Vb in a ratio equal to the resistance ratio between the resistors 13b and 13c to thereby derive a voltage vb indicative of the battery voltage Vb. For example, in case that the safe charging voltage Vmax is 4.2 V and the reference voltage vmax is 1.2 V, the resistance ratio is set to 2:7 which is equal to the voltage ratio of 1.2:4.2. The voltage vb appears on the connection node of the resistors 13b and 13c.

The comparator 13 is comprised of a high-gain amplifier. The comparator 13 has a non-inverting input terminal (+) thereof connected with the output terminal of the reference voltage source 12 to receive the reference voltage vmax and an inverting input terminal (−) thereof connected with the connection node of the resistors 13b and 13c to receive the voltage vb. Further, the comparator 13 has an internal circuit characteristic such as to realize a hysteresis characteristic which is defined by a first threshold voltage equal to the reference voltage vmax and a second threshold voltage equal to a voltage indicative of the interruption voltage Vmin (corresponding to the product of the resistance ratio of the resistors 13b and 13c and the interruption voltage Vmin). The comparator 13, which is designed to determine the voltage vb based on the hysteresis characteristic, operates to output an output voltage of a first level (for example, high-level output) which brings the switching device 11 into a cutoff state via a diode 41 and the driving circuit 14 until the battery voltage vb reaches the reference voltage vmax, and output a comparator output voltage of a second level (for example, low-level output) which brings the switching device 11 into a conductive state via the diode 41 and the driving circuit 14 in a period from the time the battery voltage vb has reached the reference voltage vmax until it becomes lower than the voltage equivalent to the interruption voltage Vmin.

The driving circuit 14 is comprised of a high-gain amplifier. The driving circuit 14 has a non-inverting input terminal thereof connected via a resistor 51 with the output terminal of the reference voltage source 12 to receive that voltage appearing at a connection node between the resistor 51 and a resistor 52 which serves as a reference voltage vref (FIG. 6) for control of the bypass current (the drain current of the FET 11), an inverting input terminal thereof connected via the diode 41 with the output terminal of the comparator 13 to receive the output voltage of the comparator, and an output terminal thereof connected to the gate electrode G of the FET 11. The resistance ratio between the resistors 51 and 52 is set so that the reference voltage vref is less than the high-level output voltage of the comparator 13.

A bypass current detection resistor 31 is inserted in the bypass current line 11a between the source electrode S and the terminal 3b of the connector section 3, so that a voltage indicative of the bypass current value Ib is generated across the resistor 31. The connection node of the current detection resistor 31 and the FET 11 is connected to the inverting input terminal of the amplifier 14 via the feedback resistor 32.

The driving circuit 14 is so designed that it outputs a low-level output voltage, e.g., zero volt, when a high-level output voltage is output from the comparator 13 to render the diode 41 conductive, i.e., when the driving circuit 14 receives at its inverting input terminal with the high-level output voltage of the comparator 13, and that the driving circuit 14 outputs a high-level output voltage such as to make the voltage across the resistor 31 equal to the reference voltage vref when a low-level output voltage is output from the comparator 13 to render the diode 41 cutoff.

In FIG. 6, reference numeral 61 denotes a diode for protecting the circuit upon misconnection, and 62 denotes a low-pass filter comprised of an inductor and two resistors. Reference numeral denotes a low-pass input filter comprised of a resistor and a capacitor and connected with the inverting input terminal of the comparator 13. Reference numeral 64 denotes a circuit for adjusting a negative feedback response time. The adjusting circuit 64 is comprised of a resistor and a capacitor, and is interposed between the amplifier circuit 14 and the FET 11.

With the circuit arrangement explained in the above, a low-level output voltage of the driving circuit 14 is output to the gate electrode G of the FET 11 to thereby render the FET 11 cutoff until the voltage vb indicative of the battery voltage Vb across the battery cell reaches the reference voltage vmax, that is, while a high-level output voltage of the comparator 13 is applied via the diode 41 to the inverting input terminal of the amplifier 14. When a low-level output voltage is output from the comparator 13 as the battery voltage Vb increases, the driving circuit 14 supplies the gate electrode G of the FET 11 with a high-level output voltage such as to make the voltage across the resistor 31 equal to the reference voltage vref which is applied to the non-inverting input terminal of the circuit 14. As a result, a positive gate voltage is supplied from the driving circuit 14 to the FET 11, so that a considerably large portion of the battery charging current flows through the current line 11a and the FET 11 as a bypass current Ib. The voltage across the resistor 31 indicating the bypass current Ib is fed back to the inverting input terminal of the driving circuit 14 via the resistor 32. The driving circuit 1 operates in such a manner that the negative feed back voltage indicative of the voltage across the resistor 31 is made equal to the reference voltage vref. More specifically, the gate voltage supplied from the driving circuit 14 to the FET 11 increases to thereby increase the drain current of the FET 11, i.e., the bypass current Ib, while the bypass current Ib is less than a desired current value corresponding to the reference voltage vref. On the other hand, if the bypass current Ib exceeds the aforementioned desired current value, the gate voltage decreases so that bypass current Ib decreases. In this manner, the bypass current Ib is controlled to a constant value. In other words, the FET 11, the driving circuit 14 and the resistors 31, 32 constitute a negative feedback circuit for keeping the bypass current at a constant value (more generally, a driving circuit for keeping the bypass current constant).

Each of the voltage divider circuits 15a, 15b includes a variable resistor having one end thereof connected to the terminal 3a of the connector section 3 via the voltage sensing line 40 and a fixed resistor having one end thereof connected to the other end of the variable resistor, and serves to divide the battery voltage Vb in a ratio equal to the resistance ratio of the variable and fixed resistors to thereby derive a voltage indicating the battery voltage Vb. For example, in a case where the abnormally high voltage of the battery B is 4.33 V, the abnormally low voltage is 2.70 V and the reference voltage vmax is 1.2 V, the resistance ratio in the voltage divider circuit 15a is set to 1.2:4.33 and the resistance ratio in the voltage divider circuit 15b is set to 1.2:2.70.

The abnormality detection circuit 15 includes two high-gain amplifiers (comparators) 15d, 15e for independently detecting the abnormally high voltage and abnormally low voltage of the battery cell B. The high-gain amplifier 15d has a non-inverting input terminal (+) thereof connected to the output terminal of the reference voltage source 12 to receive the reference voltage vmax as a reference value used for determination of the abnormally high voltage and an inverting input terminal (−) thereof connected to the connection node of the two resistors of the voltage divider circuit 15a to receive an output voltage, indicating the battery voltage Vb, from the voltage divider circuit 15a, and operates to output an abnormality observation signal indicating occurrence of an abnormally high voltage when the battery voltage exceeds the reference value. The high-gain amplifier 15e has an inverting input terminal thereof connected to the output terminal of the reference voltage source 12 to receive the reference voltage vmax as a reference value used for determination of the abnormally low voltage and a non-inverting input terminal thereof connected to the connection node of the two resistors of the voltage divider circuit 15b to receive an output voltage indicating the battery voltage Vb from the voltage divider circuit 15b, and operates to output an abnormality observation signal indicating occurrence of an abnormally low voltage when the battery voltage becomes lower than the reference value.

Figure 7:
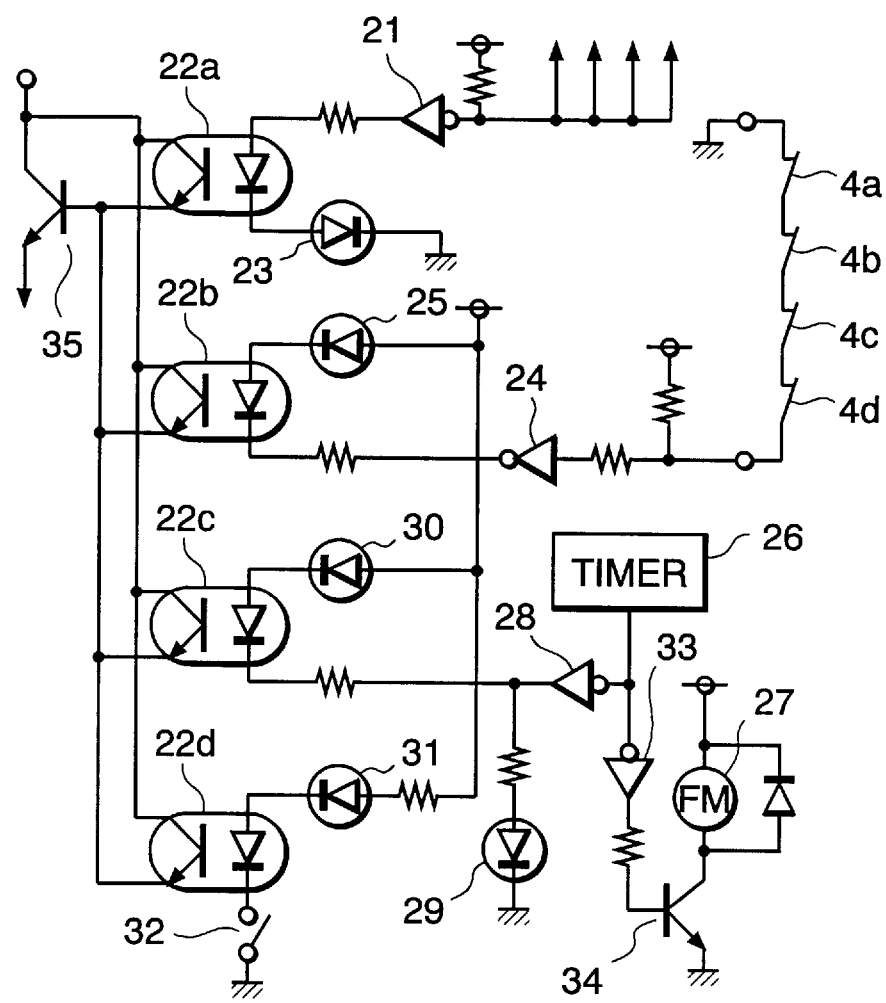
FIG. 7 is a diagram showing an example of the construction of an outlying processing circuit used in the battery charger shown in FIG. 1.

Abnormality observation signals detected by the abnormality detection circuit 15, i.e., outputs of the high-gain amplifiers (comparators) 15d and 15e are subjected to the logical sum (OR) process achieved by diodes 15f, 15g, and are output via a photocoupler 15c to the outlying processing circuit constructed as shown in FIG. 7. The outlying processing circuit will be described later.

Next, the operation of the battery charger is explained with reference to FIGS. 8 to 15.

To clarify the charge control function of the battery charger, the initial state in which the remaining charging capacity of the battery cells $B_1$, $B_2$, $B_3$, $B_4$ constituting the battery array are intentionally made different is set up by individually discharging the battery cells $B_1$, $B_2$, $B_3$, $B_4$ at the discharging current of 30 amperes for the following discharging periods of time (discharging amounts) after these battery cells are uniformly charged to the optimum charging voltage Vmin., so that the battery cell $B_2$ has the largest remaining capacity and the battery cell $B_1$ has the smallest remaining capacity.

Battery cell $B_1$ - - - 50 minutes (25.0 Ah)
Battery cell $B_2$ - - - 10 minutes (6.0 Ah)
Battery cell $B_3$ - - - 35 minutes (17.5 Ah)
Battery cell $B_4$ - - - 20 minutes (10.0 Ah)

In FIG. 1 and FIGS. 8 to 14, symbols $I_1$, $I_2$, $I_3$, $I_4$ denote currents flowing through the battery cells $B_1$, $B_2$, $B_3$, $B_4$, respectively, and symbols $I_5$, $I_6$, $I_7$ denote currents flowing from the connection nodes between the charge control circuits 2a, 2b, 2c, 2d to the connection nodes between the battery cells $B_1$, $B_2$, $B_3$ and $B_4$, respectively. In FIG. 1, arrows attached to symbols $I_5$, $I_6$, $I_7$ indicate current flows in the positive direction.

Figure 8:
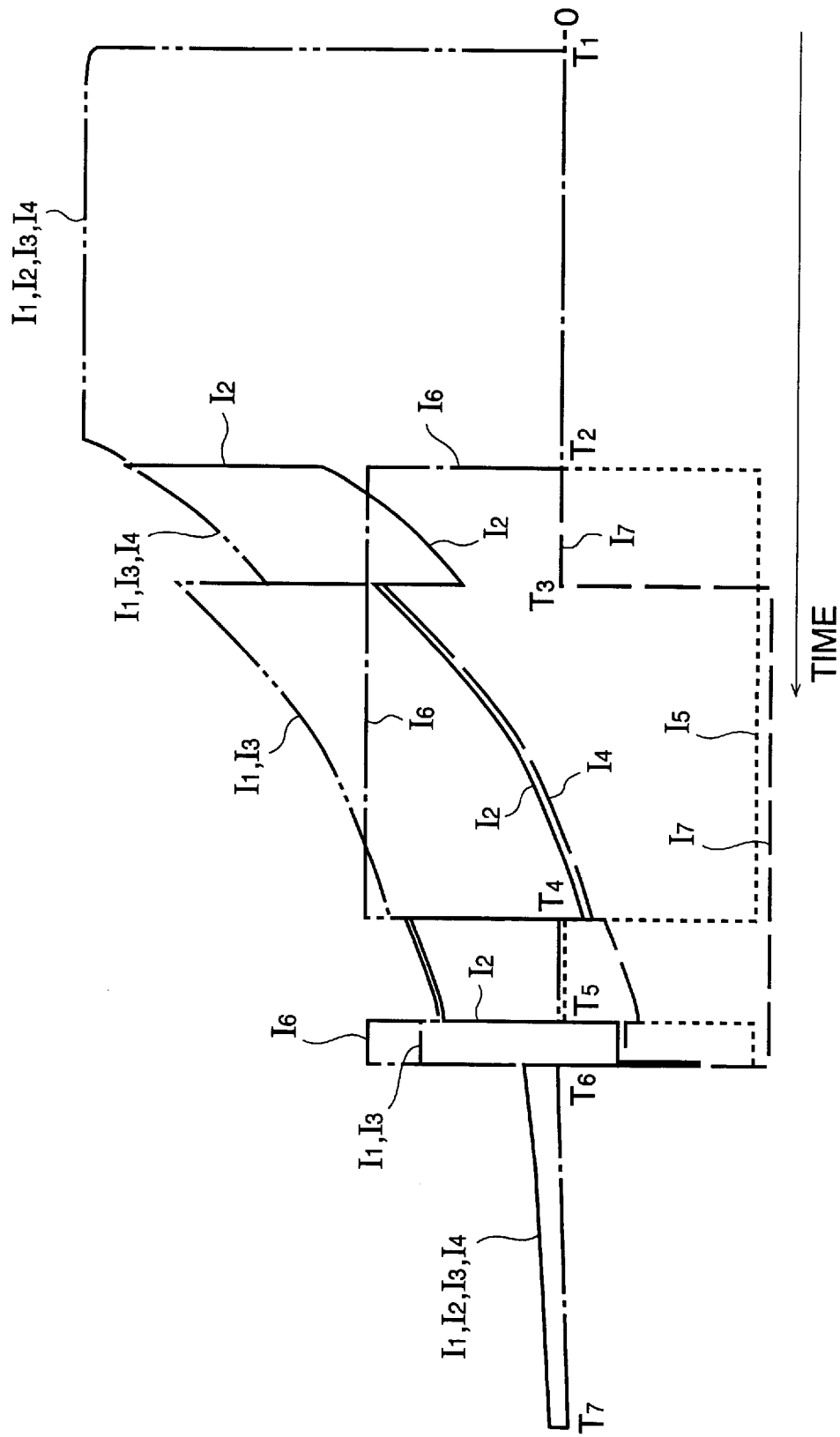
FIG. 8 is a graph collectively showing time-dependent changes in currents appearing at various sections of the battery charger shown in FIG. 1 when the battery array is charged by the battery charger.
Figure 9:
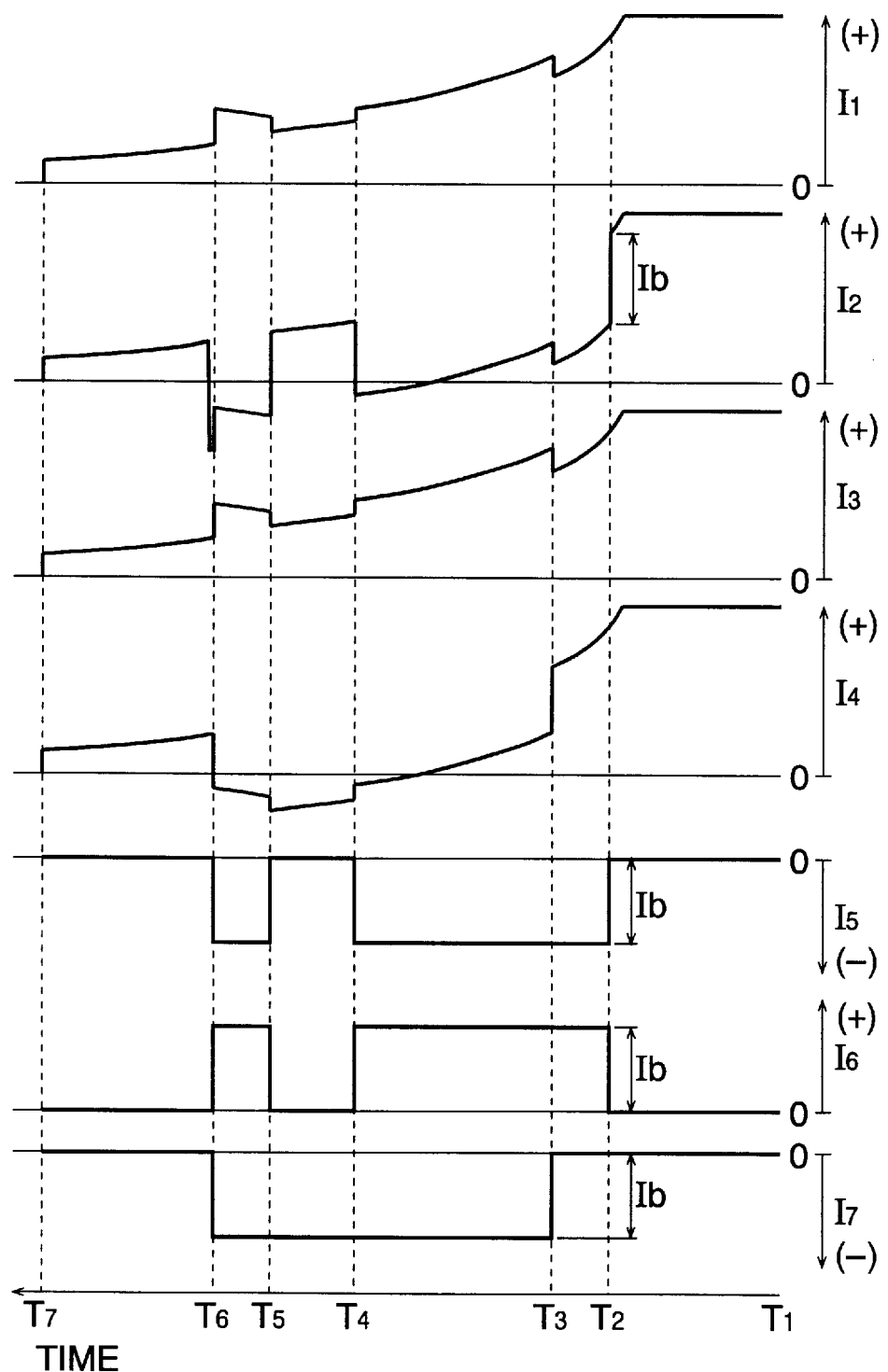
FIG. 9 is a graph separately showing time-dependent changes in currents appearing at various sections of the battery charger shown in FIG. 1.

FIG. 8 shows time-dependent changes in the currents $I_1$ to $I_7$ at the time of charging in comparison with one another, and FIG. 9 shows the current changes independently of one another. FIGS. 10 to 15 schematically show the current flows observed at several stages (timings) in the charging process.

Figure 10:
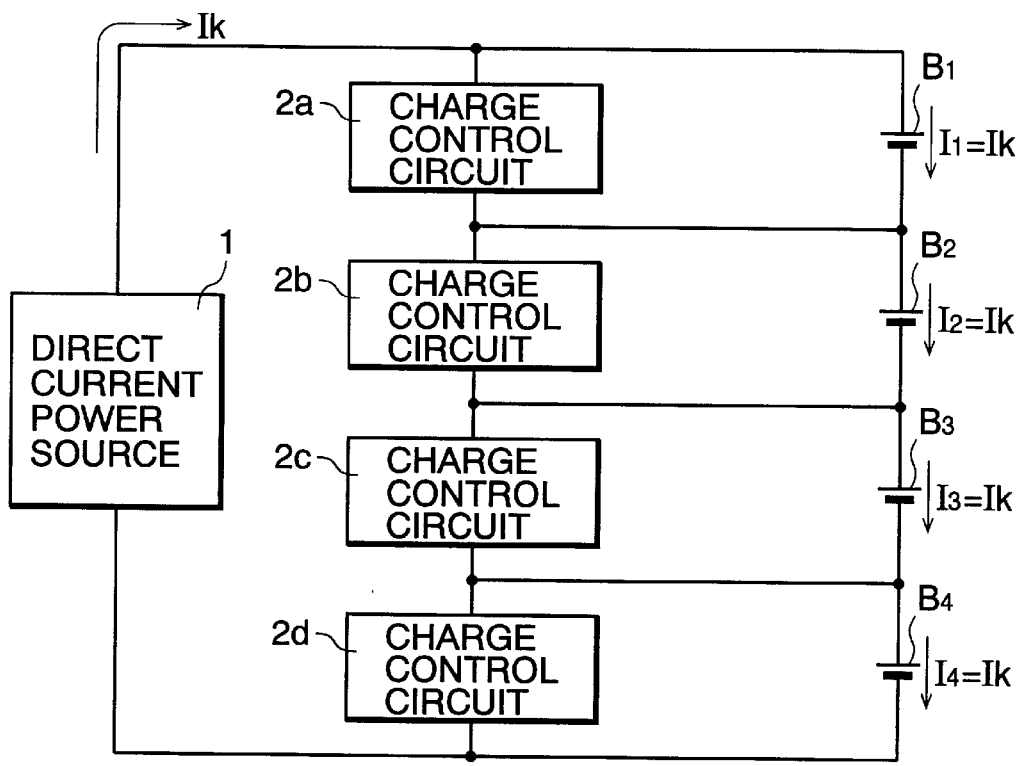
FIG. 10 is a diagram schematically showing a first configuration of current paths created between the battery array and the charge control circuits.

At the time (timing T1) when the direct current power source 1 is operated to start the supply of the charging current to the battery array, each battery cell B is in the aforementioned discharged states and hence is not in the fully charged state. Therefore, the maximum supply current Ik of the direct current power source 1 flows through the battery cells $B_1$, $B_2$, $B_3$, $B_4$ as the charging currents $I_1$, $I_2$, $I_3$, $I_4$ (arbitrary one or ones of them are hereinafter referred to as a charging current or currents Ii), as shown in FIG. 10, so that the battery cells are charged. Since the charge control circuits 2a, 2b, 2c, 2d having high internal resistances are respectively connected in parallel with the battery cells $B_1$, $B_2$, $B_3$, $B_4$, the voltage supplied from the direct current power source 1 is substantially equally divided and the thus equally divided voltage is applied between the two terminals of each battery cell B.

When the battery cell $B_2$ whose remaining capacity is largest at the initial setting comes closer to the fully charged state with the passage of time, the current I supplied from the direct current power source 1 starts to decrease and then the direct current power source 1 effects the constant-voltage operation.

At this time, the battery voltage $V_{b2}$ (FIG. 1) across the battery cell $B_2$ becomes higher than the battery voltages $V_{b1}$, $V_{b3}$, $V_{b4}$ (FIG. 1) across the other battery cells $B_1$, $B_3$, $B_4$. When the battery voltage $V_{b2}$ across the battery cell $B_2$ reaches the fully charged voltage Vmax (timing T2), the switching device 11 of the charge control circuit 2b connected in parallel with the battery cell $B_2$ is rendered conductive (turned ON), whereas the switching devices 11 of the other charge control circuits 2a, 2c, 2d remain in the OFF state.

Figure 11:
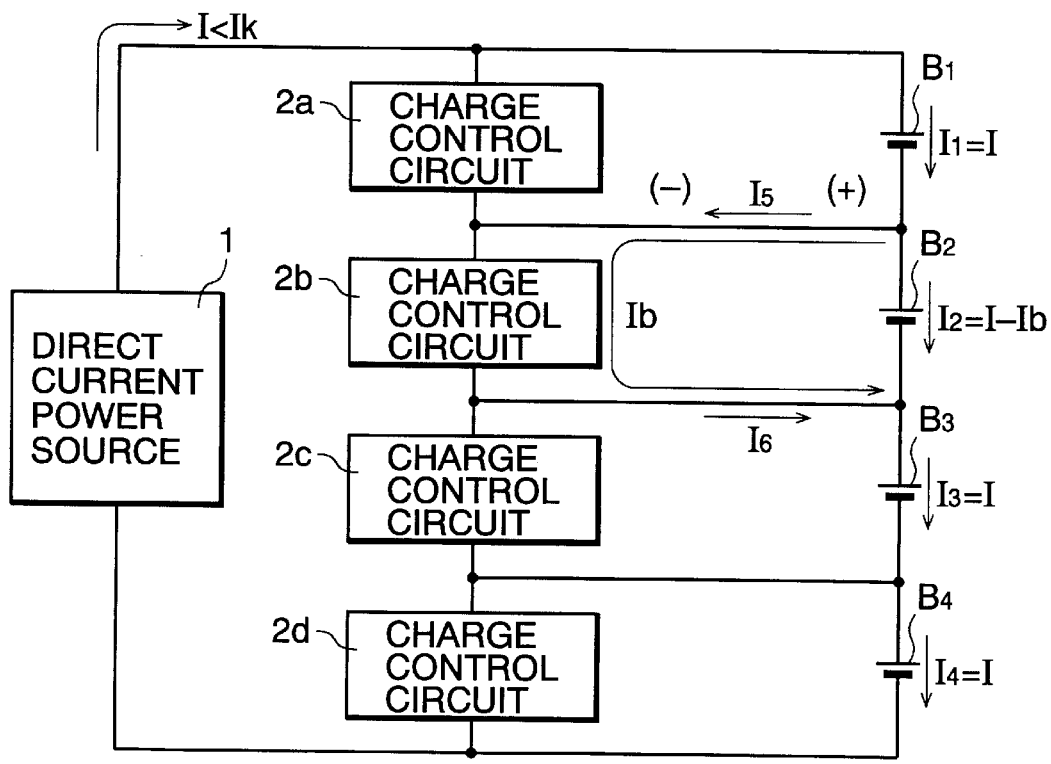
FIG. 11 is a diagram schematically showing a second configuration of current paths created between the battery array and the charge control circuits.

Thus, as shown in FIGS. 8, 9 and 11, a constant amount of current out of the charging current supplied to the battery cell $B_2$ is forcedly drawn into the charge control circuit 2b. More specifically, a current $I_5$ flows in the negative direction from the connection node of the battery cells $B_1$ and $B_2$ (on the positive electrode side of the battery cell $B_2$) to the positive terminal side of the charge control circuit 2b, and a current $I_6$ flows in the positive direction from the negative terminal side of the charge control circuit 2b to the connection node of the battery cells $B_2$ and $B_3$ (on the negative electrode side of the battery cell $B_2$). In other words, the bypass current Ib flows through the charge control circuit 2b. As a result, the charging current supplied to the battery cell $B_2$ is reduced by an amount of the bypass current Ib, so that the current $I_2$ flowing into the battery cell $B_2$ is drooped to I–Ib (FIGS. 8 and 9). As a result, the charging current amount $I_2$ for the battery cell $B_2$ is suppressed to a small value, thereby maintaining the battery voltage $V_{b2}$ substantially at the safe charging voltage Vmax.

Under the condition that the charge control circuit 2b is in the conduction state, the internal resistance (Vmax/Ib=4.2 V/3 A=1.4 &8_) of the charge control circuit 2b acts in parallel with the battery cell $B_2$, so that the apparent resistance between the two electrodes of the battery cell $B_2$ is slightly reduced. As a result, a current supplied from the direct current power source 1, that is, the current I flowing through each battery cell is slightly increased by an amount corresponding to the reduced amount of resistance.

If, in this state, the process of charging each battery cell B proceeds, each battery cell B, particularly, the battery cell $B_4$ having the second-largest remaining capacity at the initial setting comes closer to the fully charged state, and the current I flowing through each battery cell B gradually decreases.

Figure 12:
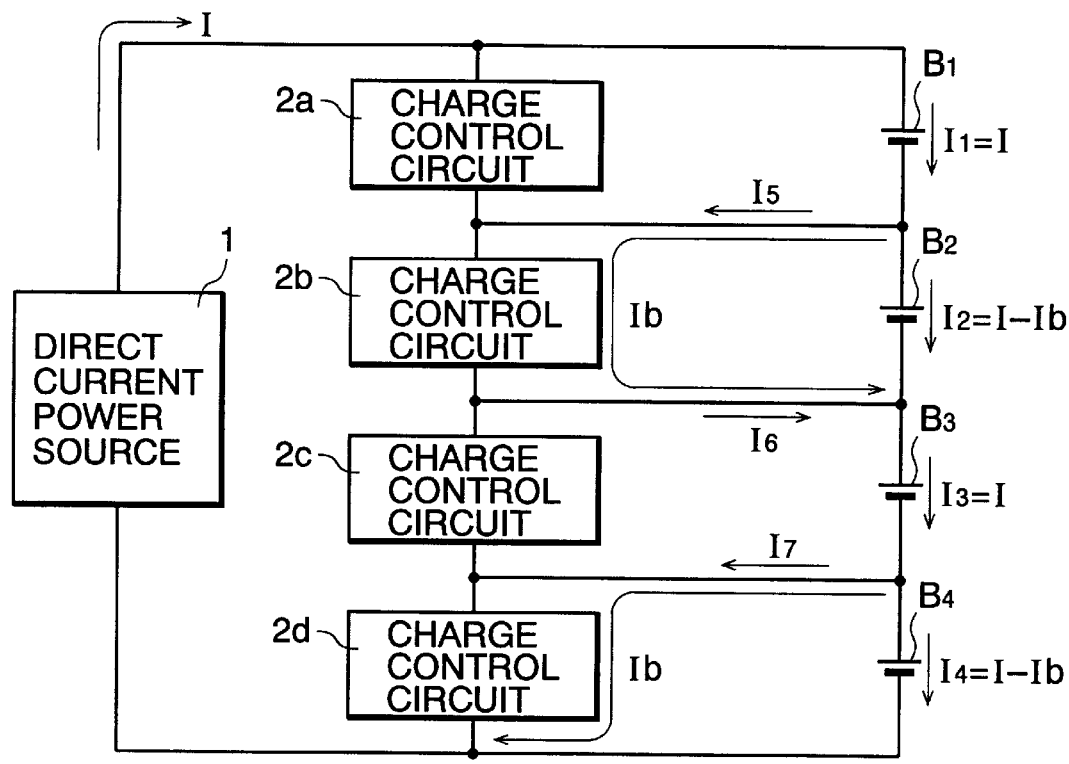
FIG. 12 is a diagram schematically showing a third configuration of current paths created between the battery array and the charge control circuits.

If the process of charging the battery cells $B_1$, $B_2$, $B_3$, $B_4$ further proceeds and the battery cell $B_4$ comes closer to the fully charged state, the battery voltage $V_{b4}$ across the battery cell $B_4$ becomes high. When the battery voltage $V_{b4}$ has reached the safe charging voltage Vmax (timing T3), the switching device 11 of the charge control circuit 2d which is connected in parallel with the battery cell $B_4$ is made conductive. As a result, as shown in FIG. 12, the charge control circuit 2d forcedly draws a constant portion of the charging current. That is, a current $I_7$ is caused to flow from the connection node of the battery cells $B_3$ and $B_4$ to the positive terminal side of the charge control circuit 2d. As a result, the bypass current Ib flows into the charge control circuit 2d, and the charging current I supplied to the battery cell $B_4$ is reduced by an amount of the bypass current Ib, so that the current $I_4$ flowing into the battery cell $B_4$ is drooped to I–Ib (FIGS. 8 and 9). The voltage $V_{b4}$ across the battery cell $B_4$ is suppressed substantially at the safe charging voltage Vmax.

The internal resistance of the charge control circuit 2d which is in the conduction state affects in parallel with the battery $B_4$, and thus the apparent impedance between the two electrodes of the battery cell $B_4$ is lowered. At this point of time (timing T3 in FIG. 9), the battery cells $B_1$ and $B_3$ still remain in the insufficiently charged state. As a result, the current I supplied from the direct current power source 1, that is, the currents I1, I2, I4 flowing into the battery cells $B_1$, $B_2$, $B_4$ are increased to a relatively large extent. Then, the charging operation for each battery cell B continues.

Since the voltages $V_{b2}$, $V_{b4}$ across the battery cells $B_2$, $B_4$ are held at the safe charging voltage Vmax as described before, the remaining voltage (Vk–2Vmax) out of the constant voltage Vk (=4Vmax=16.6 V) applied from the direct current power source 1 is distributed between and applied to the insufficiently charged battery cells $B_1$ and $B_3$. Therefore, each of the voltages $V_{b1}$, $V_{b3}$ across the battery cells $B_1$, $B_3$ is substantially equal to Vmax.

As the charging process proceeds under this condition, the charging capacities of the battery cells $B_1$, $B_3$ gradually increase, and particularly, the battery cell $B_3$ having a third-largest charge remaining capacity at the initial setting comes closer to the fully charged state, and the current I supplied from the direct current power source 1, i.e., the current Ii flowing through the battery cell B gradually decreases.

Despite that the current I supplied from the direct current power source 1 decreases, the charge control circuit 2b connected in parallel with the battery cell $B_2$ continues to forcedly draw a constant current (bypass current Ib) from the battery cell $B_2$. As a result, as shown in FIGS. 8 and 9, the currents $I_2$, $I_4$ of the battery cells $B_2$, $B_4$ decrease into a negative region. That is, the current $I_2$ (=Ib–I) is drawn out from the battery cell $B_2$ so that the battery cell $B_2$ is discharged. The current $I_2$ is supplied to the battery cell $B_3$. In other words, a shortage of the supply current from the direct current power source 1 is compensated for by the discharging current from the battery cell $B_2$. Likewise, while the charge control circuit 2d continues to forcedly draw a constant bypass current Ib, an insufficient current is drawn out from the battery cell $B_4$, so that the battery cell $B_4$ is discharged.

Figure 13:
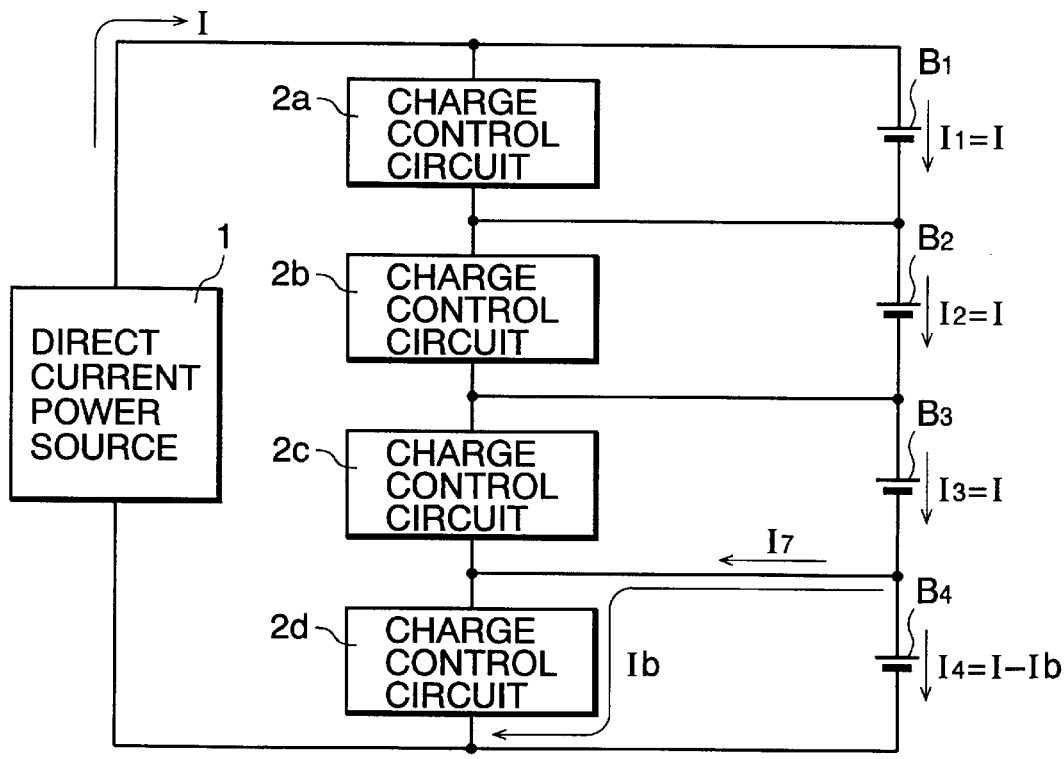
FIG. 13 is a diagram schematically showing a fourth configuration of current paths created between the battery array and the charge control circuits.

By the discharging operation, the voltages $V_{b2}$, $V_{b4}$ across the battery cells $B_2$, $B_4$ gradually decrease. Under the condition that the battery cell $B_2$ has been first brought in the substantially fully charged state, a change in voltage (voltage drop) caused by the discharging is larger in the battery cell $B_2$ than in the battery cell $B_4$ depending on the battery characteristic. For this reason, the battery voltage (charged voltage) $V_{b2}$ of the battery cell $B_2$ becomes lower than the interruption voltage Vmin determined by the aforementioned hysteresis characteristic of the comparator 13. As a result, the switching device 11 of the charge control circuit 2b is turned OFF and its operation of forcedly drawing the bypass current Ib is interrupted (timing T4). With the turn-OFF operation of the switching device 11, the currents $I_5$, $I_6$ become zero, and the current $I_1$ which has flowed through the battery cell $B_1$ is caused to flow into the battery cell $B_2$, as shown in FIG. 13, so that the battery cell $B_2$ is charged with the current $I_2$ (=I).

On the contrary, a change in charging voltage of the battery cell $B_4$ caused by the discharging is less since the charging capacity of the battery cell $B_4$ is smaller than that of the battery cell $B_2$, and hence the switching device 11 of the charge control circuit 2b remains in the ON state. Thus, the battery cell $B_4$ is further discharged with a small current.

With the turn-OFF operation of the charge control circuit 2b, the switching device 11 of the circuit 2b is electrically disconnected from the battery cell $B_2$, and the apparent resistance between the two electrodes of the battery cell $B_2$ is slightly increased by a value equivalent to the internal resistance of the switching device which has affected in parallel with the battery cell $B_2$. As a result, the current I supplied from the direct current power source 1, i.e., the current Ii flowing into the battery cell B is slightly reduced. Further, the charging of the battery cell $B_2$ is restarted, so that the battery voltage $V_{b2}$ across the battery cell $B_2$ is increased to the optimum charging voltage Vmin.

With the increase of the battery voltage $V_{b2}$, the charging capacity of the battery cell $B_2$ is increased again. When the voltage $V_{b2}$ across the battery cell $B_2$ reaches the optimum charging voltage Vmin again (timing T5), the switching device 11 of the charge control circuit 2b is turned ON again and a constant current Ib is drawn into the circuit 2b. In other words, the currents $I_5$, $I_6$ are caused to flow as shown in FIG. 12. In the charging stage from the timing T4 to the timing T5 shown in FIGS. 8 and 9, the current I supplied from the direct current power source 1 is already considerably reduced. Thus, even if the discharging of the battery cell $B_2$ is temporarily interrupted (timing T4), the discharging of the battery cell $B_2$ is immediately restarted (timing T5), so that the battery voltage $V_{b2}$ across the battery cell $B_2$ is lowered in a relatively short time.

In this stage, the battery cell $B_4$ is also considerably discharged and hence the battery voltage $V_{b4}$ is also lowered. Under the condition that the battery cells $B_1$, $B_3$ get closer to the fully charged state, the battery cells $B_2$, $B_4$ remain in the fully charged state while repeatedly effecting their charging and discharging operations in response to the ON/OFF actions of the associated switching devices 11.

When both the voltages $V_{b2}$, $V_{b4}$ across the battery cells $B_2$, $B_4$ become lower than the interruption voltage Vmin due to the discharging operation (timing T6), the switching devices 11 of the charge control circuits 2b, 2d are both turned OFF and the current drawing actions of all the charge control circuits 2a, 2b, 2c, 2d are terminated, as shown in FIG. 10.

Figure 14:
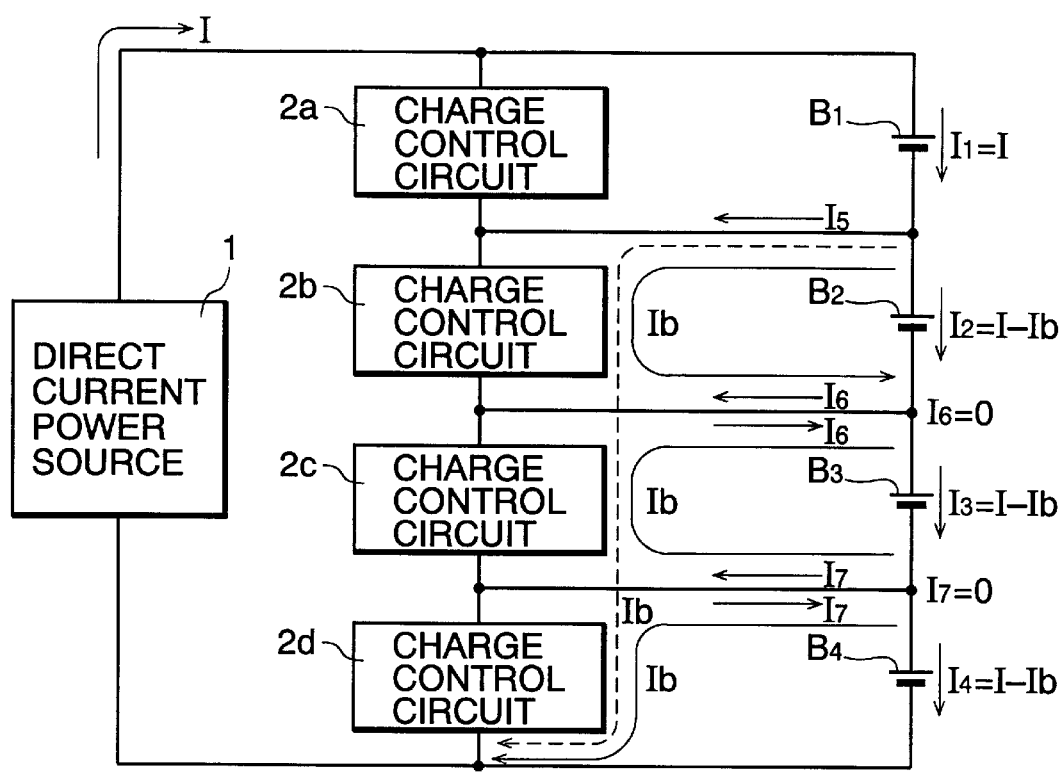
FIG. 14 is a diagram schematically showing a fifth configuration of current paths created between the battery array and the charge control circuits.

In the meantime, until all of the battery cells $B_1$, $B_2$, $B_3$, $B_4$ reach the fully charged state, the voltage $V_{b3}$ across the battery cell $B_3$ may sometimes rise to thereby turn ON the switching device 11 of the charge control circuit 2c as shown in FIG. 14, so that part of the current $I_3$ which flows through the battery cell $B_3$ may be drawn into the circuit 2c. In this manner, the operations of the charge control circuits 2a, 2b, 2c, 2d vary depending on the charged states of the battery cells $B_1$, $B_2$, $B_3$, $B_4$. At any rate, the discharge action of the battery cell B which has reached the fully charged state is naturally caused, so that the battery voltage $V_b$ is lowered to be less than the interruption voltage Vmin. Finally, all the switching devices 11 of the charge control circuits 2a, 2b, 2c, 2d are turned OFF.

At this stage, all the battery cells $B_1$, $B_2$, $B_3$, $B_4$ are brought in the fully charged state and their internal resistances are made substantially equal to one another. Therefore, the battery voltages Vb across the battery cells $B_1$, $B_2$, $B_3$, $B_4$ are settled to the optimum charging voltage Vmin which is equivalent to the voltage obtained by substantially equally dividing the voltage Vk applied from the direct current power source 1. Under this condition, a small current I is continuously supplied from the direct current power source 1. The small supply current I is equivalent to the self discharge current of each battery cell B. Therefore, the supply of the small current ensures that each battery cell B can be sufficiently charged without fail and their self discharging can be prevented.

Even if such a small charging current for the fully charged battery cell B is continuously supplied for a long time, the charging capacity cannot be further enhanced. To shorten the total charging time and prevent a possible over-charging, it is preferable to terminate the supply of the charging current I at a certain timing T7. As for the termination timing of the charging current supply, the below-mentioned management using a timer is advisable.

In the above, the basic operation of the battery charger according to one preferred embodiment of this invention has been explained. The basic operation can be summarized as follows. The charge control circuits 2a, 2b, 2c, 2d connected in parallel with the battery cells $B_1$, $B_2$, $B_3$, $B_4$ are operable to selectively forcedly draw constant portions of the currents $I_1$, $I_2$, $I_3$, $I_4$ flowing through the battery cells $B_1$, $B_2$, $B_3$, $B_4$ according to the battery voltages Vb, respectively. Even if a variation is found between the charging capacities of the battery cells $B_1$, $B_2$, $B_3$, $B_4$ at the start of charging, a constant amount of current is drawn out from substantially fully charged battery cell B, while monitoring a change in the battery voltage Vb caused with the increase in the charging capacity, and therefore, it becomes possible to efficiently charge the battery cells $B_1$, $B_2$, $B_3$, $B_4$ while permitting discharge of one or ones of the battery cells according to their charged state.

In the course of bringing the battery cells $B_1$, $B_2$, $B_3$, $B_4$ into the fully charged state, the voltages across these battery cells are kept at the optimum charging voltage Vmin while supplying the individual battery cell with a voltage obtained by dividing the voltage Vk applied from the direct current power source 1 between the battery cells $B_1$, $B_2$, $B_3$, $B_4$. This makes it possible to improve the charging efficiency and to complete the charging process in a short time.

To be noted, if the supply current amount is reduced by controlling the direct current power source each time any one of the battery cells has reached the fully charged state, the charging time for insufficiently charged battery cells becomes long. The overall charging time is also prolonged if the charging current for the battery cell whose voltage becomes high is simply bypassed as is disclosed in the aforementioned Publication, because the charging currents for the remaining insufficiently charged battery cells are also reduced.

In this respect, according to this invention, the battery cells are rapidly charged until they come closer to the fully charged state and then a maximum charging current is ensured for insufficiently charged battery cells while reducing the charging current for nearly fully charged battery cell or permitting discharge of these battery cells, so that the whole charging time will not be prolonged. Further, the charging operation can be efficiently carried out in the shortest possible time which varies depending on the remaining capacities of the battery cells observed at the start of charging.

With reference to FIG. 7, the outlying processing circuit briefly mentioned hereinabove is explained in detail. The outlying processing circuit is supplied with the aforementioned abnormality observation signal, indicative of occurrence of the abnormally high voltage or abnormally low voltage, from the abnormality detection circuit 15. The outlying processing circuit basically functions to monitor the operating condition of the battery charger, display the operating condition, and urgently interrupt the operation of the direct current power source 1 at the time when the abnormality is detected.

As shown in FIG. 7, abnormality observation signals from the photocouplers 15c of the abnormality detection circuits 15 of the charge control circuits 2a, 2b, 2c, 2d are supplied to a buffer (inverter circuit) 21 of the outlying processing circuit. The buffer 21 is connected at its input terminal to a voltage source and connected at its output terminal to a photodiode of a photocoupler 22a. If the photocoupler 15c of the charge control circuit 2 is rendered conductive in response to occurrence of an abnormal voltage in the battery cell B, the voltage on the input side of the buffer 21 is lowered and a high-level output of the buffer 21 is supplied via the photodiode of the photocoupler 22a to a light emitting diode 23 for indicating "Occurrence of Abnormal Voltage". As a result, the diode 23 emits light to inform the occurrence of the abnormal voltage.

The battery cells $B_1$, $B_2$, $B_3$, $B_4$ are mounted with normally-closed temperature sensors 4a, 4b, 4c, 4d each of which is designed to be turned OFF when it detects a temperature rise in the corresponding one battery cell. These temperature sensors 4a, 4b, 4c, 4d are serially connected with one another. One end of the temperature sensor group is grounded. A buffer (inverter circuit) 24 of the outlying processing circuit has an input terminal thereof connected to the other end of the temperature sensor group and a voltage source, and has an output terminal thereof connected to the photodiode of the photocoupler 22b. When the temperature of any one of the battery cells $B_1$, $B_2$, $B_3$, $B_4$ rises and a corresponding one of the temperature sensors 4a, 4b, 4c, 4d is turned OFF, a voltage applied to the input terminal of the buffer 24 increases and hence a low-level voltage appears at the output terminal of the buffer 24. As a result, a light emitting diode 25 for indicating "Excessive Rise in Battery Temperature" is driven to emit light.

A timer 26 incorporated in the outlying processing circuit is triggered at the start of the operation of the direct current power source 1 to measure a preset charge management time. In a period from the time the timer 26 is triggered until the charge management time elapses, a low-level output is output from the timer 26 and hence a high-level output is output from the inverter circuit 33. In response to this high-level output, a transistor 34 is turned ON, so that a fan motor 27 for cooling the battery cells $B_1$, $B_2$, $B_3$, $B_4$ is driven. Further, a light emitting diode 29 for indicating "During Charging Operation" is driven for light emission in response to a high-level output of an inverter circuit 28 which is supplied with the low-level output of the timer 26. A light emitting diode for indicating "Completion of Charging" is connected to the output terminal of the inverter circuit 28 via a photodiode of a photocoupler 22c. When the charge management time has elapsed and an output of the timer 26 is changed over from the low level to the high level, the light emitting diode 30 is driven for light emission.

Further, the outlying processing circuit includes a light emitting diode 31 incorporated therein for indicating "Occurrence of Excessive Current". The light emitting diode 31 has its input terminal connected to a voltage source and an output terminal thereof connected via a photodiode of a photocoupler 22d to an auxiliary contact 32 of a current limiting switch (not shown) incorporated in the direct current power source 1. When an excessive current flows through the direct current power source 1 so that the auxiliary contact 32 is closed, the light emitting diode 31 is driven for light emission.

When an abnormal voltage, an excessive rise in temperature of the battery cell, or excessive current occurs or the charging operation is completed, a current flows through a corresponding one of the photodiodes of the photocouplers 22a, 22b, 22c, 22d, as described above. As a result, the phototransistor of a corresponding one of the photocouplers 22a, 22b, 22c, 22d is turned ON to cause the transistor 35 to be conductive, so that a collector output is output from the transistor. The collector output permits the operation of the direct current power source 1 to be urgently interrupted.

Abnormality observation signals indicative of the thus detected abnormal charging states may be output to the outside of the outlying processing circuit.

According to the battery charger provided with the above outlying processing circuit, the charging operation can be effected while monitoring the charging state of the battery cells $B_1$, $B_2$, $B_3$, $B_4$ constituting the battery array. This permits the user to rapidly take necessary countermeasures against the occurrence of an abnormality.

This invention is not limited to the aforementioned embodiment.

Figure 3:
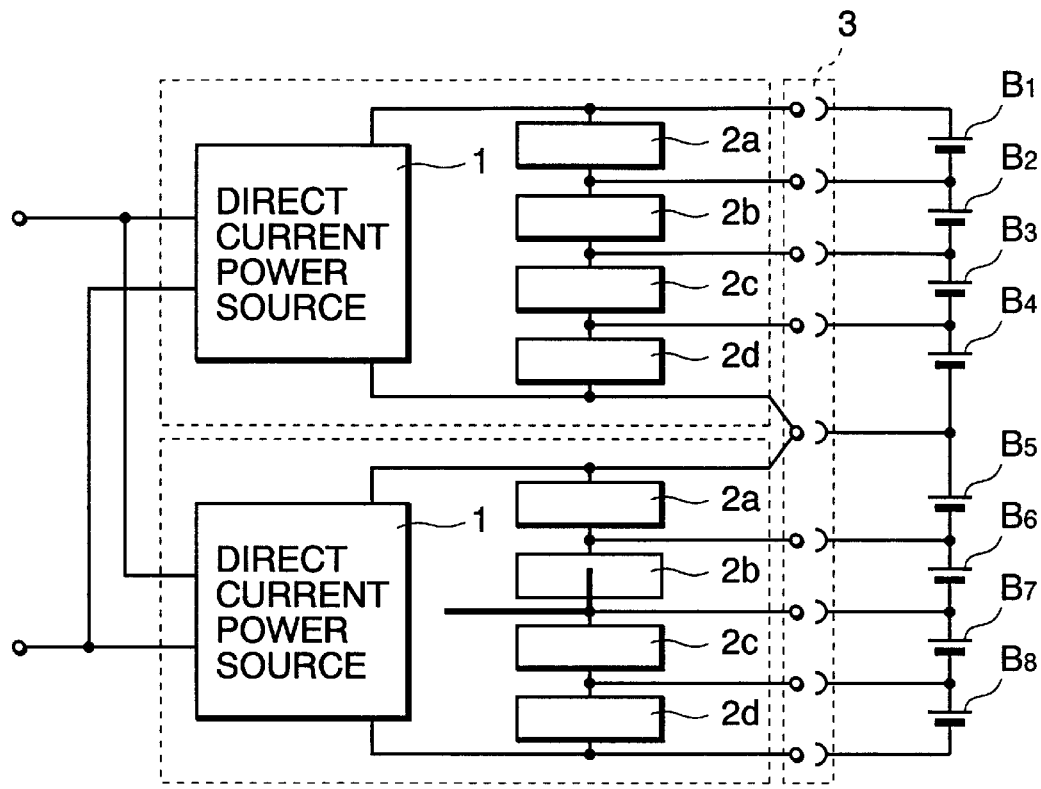
FIG. 3 is a circuit diagram showing a connecting configuration of plural battery chargers, each comprised of the battery charger of FIG. 1, for charging a large number of battery cells.

In the above embodiment, the battery charger for charging the battery array constituted by four battery cells $B_1$ to $B_4$ is explained, but the battery array may include an arbitrary number of battery cells. In the case of charging a battery array which is comprised of battery cells of a number equal to an integral multiple of 4, it is only required to serially connect a necessary number of battery chargers according to the above embodiment, as shown by way of example in FIG. 3. In FIG. 3, symbols $B_5$, $B_6$, $B_7$, $B_8$ denote battery cells which cooperate with the battery cells $B_1$, $B_2$, $B_3$, $B_4$ to constitute the battery array. In order to charge a battery array comprised of battery cells of a number different from an integral multiple of 4, the construction of the battery charger of the above embodiment may be slightly modified in accordance with the detailed explanations given hereinabove.

Instead of the comparator 13 with the above construction, two high-gain amplifiers may be employed. In this case, a voltage indicative of the battery voltage Vb and a voltage indicative of the safe charging voltage Vmax are supplied to two input terminals of one of the two amplifiers, whereas a voltage indicative of the battery voltage Vb and a voltage indicative of the optimum charging voltage Vmin are supplied to two input terminals of the other amplifier.

In the above embodiment, a case wherein this invention is applied to the charging of lithium-ion battery has been explained, but this invention is applicable to the charging of batteries other than lithium-ion battery, such as lead batter.

Further, the maximum supply current Ik, bypass current Ib, safe charging voltage Vmax, and interruption voltage Vmin are not limited to the values specified in the above embodiment. These values may be determined according to the characteristics of battery cells to be charged.

It is not indispensable to use the negative feedback circuit for the bypass current control. For example, a resistor (not shown) may be inserted in the current line 11a of the FET 11 so that the drain-to-source voltage of the FET 11 is decreased when the bypass current increases, thereby making the bypass current constant.

This invention may be variously modified without departing from the technical scope thereof.

What is claimed is:

1. A battery charger comprising:
    a direct current power source adapted to be connected in series with a battery array which is comprised of serially-connected battery cells, said direct current power source being operable to output a predetermined maximum electric current when it performs a constant-current operation; and
    charge control circuits adapted to be connected in parallel with the serially-connected battery cells, respectively, each of said charge control circuits including:
        a switching device which is connected in parallel with an associated one of the battery cells when said charge control circuit is connected to the associated one battery cell;
        a comparator, having a hysteresis characteristic thereof determined by a first threshold voltage and a second threshold voltage lower than the first threshold voltage, for comparing a battery voltage across the associated one battery cell with one of the first and second threshold voltages which is selected depending on a direction in which the battery voltage changes and for generating a comparator output indicative of a result of the comparison between the battery voltage and the selected one threshold voltage, the first and second threshold voltages being determined according to charging characteristics of the serially-connected battery cells;

a reference voltage source for generating a reference voltage corresponding to one of the first and second threshold voltages; and a driving circuit for selectively rendering the switching device conductive according to the comparator output, said driving circuit being operable to permit a constant current to flow from the associated one battery cell to said switching device when said switching device is conductive.

2. The battery charger according to claim 1, wherein said driving circuit of said each charge control circuit includes a negative feedback circuit having a resistor connected in series with said switching device, said resistor generating a voltage thereacross which is indicative of a current flowing through said switching device when said switching device is in a conduction state.

3. The battery charger according to claim 1, wherein said comparator of said each charge control circuit generates a comparator output of a first level until the battery voltage across the associated one battery cell reaches the first threshold voltage, generates a comparator output of a second level when the battery voltage rises and reaches the first threshold voltage, and generates a comparator output of the first level when the battery voltage drops and becomes lower than the second threshold voltage; and wherein said driving circuit of said each charge control circuit causes said switching device to be cutoff while the comparator output is at the second level and causes said switching device to be conductive while the comparator output is at the first level.

4. The battery charger according to claim 1, wherein said first threshold voltage is a voltage corresponding to a safe charging voltage of the associated one battery cell and the second threshold voltage is a voltage corresponding to an optimum charging voltage of the associated one battery cell.

5. The battery charger according to claim 1, wherein said each charge control circuit has a high internal resistance; and wherein a voltage applied from the direct current power source to said charge control circuits and also applied to the battery array is substantially equally divided between the charge control circuits and between the battery cells.

6. The battery charger according to claim 5, wherein said reference voltage source of said each charge control circuit generates the reference voltage based on a voltage which is applied from the direct current power source to said charge control circuits and then substantially equally divided between the charge control circuits; and wherein said each charge control circuit includes a voltage divider circuit for generating a voltage corresponding to the battery voltage across the associated one battery cell based on a voltage which is applied from the direct current power source to the battery array and then substantially equally divided between the battery cells, the thus generated voltage corresponding to the battery voltage across said associated one battery cell being supplied to said comparator.

7. The battery charger according to claim 1, wherein said each charge control circuit includes a current line through which said switching device is connected with said associated one battery cell and a power source line provided independently of and separately from the current line, said comparator and said driving circuit of said charge control circuit being connected with said associated one battery cell via said power source line.

8. The battery charger according to claim 1, wherein said each charge control circuit includes an abnormality detection circuit for monitoring occurrence of an abnormality including over-charging and over-discharging of said associated one battery cell.

9. A charge control circuit for a battery charger operable to charge a battery array comprised of serially-connected battery cells, said charge control circuit being adapted to be connected in parallel with an associated one of the battery cells, comprising:

a switching device connected in parallel with the associated one battery cell;

a comparator, having a hysteresis characteristic thereof determined by a first threshold voltage and a second threshold voltage lower than the first threshold voltage, for comparing a battery voltage across the associated one battery cell with one of the first and second threshold voltages which is selected depending on a direction in which the battery voltage changes and for generating a comparator output indicative of a result of the comparison between the battery voltage and the selected one threshold voltage, the first and second threshold voltages being determined according to charging characteristics of the serially-connected battery cells;

a reference voltage source for generating a reference voltage corresponding to one of the first and second threshold voltages; and a driving circuit for selectively rendering the switching device conductive according to the comparator output, said driving circuit being operable to permit a constant current to flow from the associated one battery cell to said switching device when said switching device is conductive.

10. The charge control circuit according to claim 9, wherein said driving circuit includes a negative feedback circuit having a resistor connected in series with said switching device, said resistor generating a voltage thereacross which is indicative of a current flowing through said switching device when said switching device is in a conduction state.

11. The charge control circuit according to claim 9, wherein said comparator generates a comparator output of a first level until the battery voltage across the associated one battery cell reaches the first threshold voltage, generates a comparator output of a second level when the battery voltage rises and reaches the first threshold voltage, and generates a comparator output of the first level when the battery voltage drops and becomes lower than the second threshold voltage; and wherein said driving circuit causes said switching device to be cutoff while the comparator output is at the second level and causes said switching device to be conductive while the comparator output is at the first level.

12. The charge control circuit according to claim 9, wherein said first threshold voltage is a voltage corresponding to a safe charging voltage of the associated one battery cell and the second threshold voltage is a voltage corresponding to an optimum charging voltage of the associated one battery cell.

13. The charge control circuit according to claim 9, further including:

a current line through which said switching device is connected with said associated one battery cell; and a power source line provided independently of and separately from the current line, wherein said comparator and said driving circuit are connected with said associated one battery cell via said power source line.

14. The charge control circuit according to claim 9, further including:

an abnormality detection circuit for monitoring occurrence of an abnormality including over-charging and over-discharging of said associated one battery cell.

* * * * *